Patented Mar. 29, 1938

2,112,803

UNITED STATES PATENT OFFICE 2,112,803

PROCESS OF RECLAIMING VULCANIZED RUBBER

Johannes Behre, Hamburg-Klein-Borstel, Germany, assignor to Lehmann & Voss & Company, Hamburg, Germany No Drawing. Application October 15, 1936, Serial No. 105,832. In Germany November 4, 1935

5 Claims. (Cl. 18—52)

This invention relates to process of reclaiming vulcanized rubber.

It is of great economic importance to convert vulcanized scrap rubber such as used tires, hose or mechanical goods, which have become unsuitable for further use, so that it may be re-used as an addition or alone in the manufacture of rubber goods. To date, two methods of reclaiming vulcanized rubber are generally known, one being the heating with alkali, producing the so-called alkali reclaim, and the other being the addition of oils to ground scrap rubber and subsequent heating in steam, producing a so-called plasticate.

The addition of phosphatides to crude rubber in the unvulcanized state is known. It facilitates the incorporation as well as the dispersion of fillers, and helps to accelerate the vulcanization.

Even though the crude rubber in vulcanized products, being bound with sulphur, is insoluble in the usual solvents and no effect of the phosphatides upon it could be expected, experiments have shown that the additions of small amounts of phosphatides to vulcanized scrap rubber and subsequent heating of the mixture in high-pressure steam produce a plasticizing effect. A plasticate results which, in its physical properties, compares to the alkali reclaim and which is much superior to an ordinary plasticate. To produce the latter, 10 to 30% oil are required, the high oil content impairing its physical properties.

Phosphatides may also be added to the oil used in the usual manner, and the mixture heated with the ground scrap rubber.

Example

| | Grams |
|---|---|
| Ground scrap rubber | 100 |
| Mineral oil | 1 |
| Phosphatides | 2 |

Heat 4 hours in steam at a pressure of 4 atmospheres above atmospheric pressure.

Another alternative method is the dispersion of phosphatides in water and the addition of this aqueous solution to the ground scrap rubber.

Example

| | Grams |
|---|---|
| Ground scrap rubber | 100 |
| 1% aqueous solution of phosphatides | 100 |

Heat 4 hours in steam at a pressure of 4 atmospheres above atmospheric pressure.

What I claim is:

1. A process for reclaiming vulcanized rubber which comprises adding a small quantity of phosphatides to the vulcanized rubber and heating the mixture in the presence of steam.

2. A process for reclaiming vulcanized rubber which comprises adding a mixture of phosphatides and oil to the vulcanized rubber and heating the resulting mixture in the presence of steam.

3. A process for reclaiming vulcanized rubber which comprises, adding an aqueous solution of phosphatides to the vulcanized rubber and heating the resulting mixture in the presence of steam.

4. A process for plasticizing vulcanized rubber which comprises, providing a mixture of ground vulcanized rubber and phosphatides and subjecting the mixture to heat in the presence of steam under pressure.

5. A process for plasticizing vulcanized rubber which comprises, providing a mixture of ground vulcanized rubber and phosphatides and steaming the mixture under pressure.

JOHANNES BEHRE.